(12) United States Patent
 Nabeta

(10) Patent No.: US 9,274,308 B2
(45) Date of Patent: Mar. 1, 2016

(54) IMAGING LENS AND IMAGING APPARATUS

(71) Applicant: Sony Corporation, Tokyo (JP)

(72) Inventor: Kenshi Nabeta, Kumamoto (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/190,892

(22) Filed: Feb. 26, 2014

(65) Prior Publication Data

US 2014/0293458 A1    Oct. 2, 2014

(30) Foreign Application Priority Data

Apr. 1, 2013 (JP) ................................. 2013-075654

(51) Int. Cl.
*G02B 9/62* (2006.01)
*G02B 13/18* (2006.01)
*G02B 13/00* (2006.01)

(52) U.S. Cl.
CPC .............. *G02B 9/62* (2013.01); *G02B 13/0045* (2013.01)

(58) Field of Classification Search
CPC ......... G02B 9/62; G02B 9/64; G02B 13/0045

USPC ................................. 359/713, 754–756, 759
See application file for complete search history.

(56) References Cited

U.S. PATENT DOCUMENTS

| 2010/0172034 A1* | 7/2010 | Yoshida | 359/791 |
| 2012/0314304 A1* | 12/2012 | Huang | 359/759 |
| 2015/0085135 A1* | 3/2015 | Chen et al. | 348/164 |

FOREIGN PATENT DOCUMENTS

| JP | 2011-257448 | 12/2011 |
| JP | 2012-008490 | 1/2012 |

* cited by examiner

*Primary Examiner* — Darryl J Collins
(74) *Attorney, Agent, or Firm* — Michael Best & Friedrich LLP

(57) ABSTRACT

An imaging lens includes: a first lens having positive refractive power; a second lens having positive refractive power; a third lens having negative refractive power; a fourth lens having positive refractive power; a fifth lens having positive refractive power; and a sixth lens having negative refractive power in vicinity of an optical axis and having positive refractive power in a peripheral portion. The first to sixth lenses are arranged in order from object plane.

18 Claims, 10 Drawing Sheets

IMAGING LENS AND IMAGING APPARATUS

CROSS REFERENCE TO RELATED APPLICATIONS

This application claims the benefit of Japanese Priority Patent Application JP 2013-075654 filed Apr. 1, 2013, the entire contents of each which are incorporated herein by reference.

BACKGROUND

The present disclosure relates to an imaging lens that is suitable for a compact imaging apparatus using an imaging device such as a CCD (Charge Coupled Device) and a CMOS (Complementary Metal Oxide Semiconductor), and has a large aperture, for example, with an F number of about 2.0. Examples of the compact imaging apparatus may include a digital still camera and a mobile phone with a camera. The present disclosure also relates to an imaging apparatus that uses such an imaging lens.

Imaging apparatuses have been known such as a mobile phone with a camera and a digital still camera that use a solid-state imaging device such as a CCD and a CMOS. In such imaging apparatuses, further reduction in size has been desired. Also in a lens for shooting to be mounted on such imaging apparatuses, reduction in size and reduction in total length have been desired.

Further, in recent years, also in compact imaging apparatus such as a mobile phone with a camera, a size thereof has been reduced and the number of pixels in the imaging device has been increased. For example, a model that includes an imaging device with a large number of pixels that may be thirteen million or more has been in widespread use. Therefore, high lens performance suitable for such a solid-state imaging apparatus with a large number of pixels has been desired also in the imaging lens to be mounted on such a solid-state imaging apparatus.

On the other hand, a brighter lens having a larger aperture has been desired in order to prevent increase of noise and degradation in sensitivity of the imaging device accompanying reduction in cell pitch in such an imaging apparatus. As such a compact and high-performance imaging lens, an imaging lens having a five-lens configuration is mainstream currently. As such an imaging lens having a five-lens configuration, for example, Japanese Unexamined Patent Application Publication No. 2011-257448 (JP2011-257448A) and Japanese Unexamined Patent Application Publication No. 2012-008490 (JP2012-008490A) have been known.

SUMMARY

Lenses disclosed in JP2011-257448A and JP2012-008490A described above are each an imaging lens that has a five-lens configuration suitable for an imaging device that has about eight million pixels. The lenses in JP2011-257448A and JP2012-008490A each correct various aberrations with favorable balance while suppressing increase in an optical total length thereof. However, it may be difficult to say that the lenses are suitable for an imaging device having a large number of pixels that may be thirteen million or more. Because of the five-lens configuration, aberrations such as a spherical aberration and a comma aberration are not corrected sufficiently, and a favorable performance is not secured.

It is desirable to provide a compact imaging lens and a compact imaging apparatus that each have a favorable optical performance suitable for an imaging device having a large number of pixels.

According to an embodiment of the present disclosure, there is provided an imaging lens including a first lens having positive refractive power, a second lens having positive refractive power, a third lens having negative refractive power, a fourth lens having positive refractive power, a fifth lens having positive refractive power, and a sixth lens having negative refractive power in vicinity of an optical axis and having positive refractive power in a peripheral portion. The first to sixth lenses are arranged in order from object plane.

According to an embodiment of the present disclosure, there is provided an imaging apparatus including an imaging lens and an imaging device outputting an imaging signal based on an optical image formed by the imaging lens. The imaging lens includes a first lens having positive refractive power, a second lens having positive refractive power, a third lens having negative refractive power, a fourth lens having positive refractive power, a fifth lens having positive refractive power, and a sixth lens having negative refractive power in vicinity of an optical axis and having positive refractive power in a peripheral portion. The first to sixth lenses are arranged in order from object plane.

In the imaging lens and the imaging apparatus according to the above-described embodiments of the present disclosure, a six-lens configuration is provided as a whole, and a configuration of each lens is optimized.

According to the imaging lens and the imaging apparatus according to the above-described embodiments of the present disclosure, the six-lens configuration is provided as a whole, and the configuration of each lens is optimized. Therefore, compact size and a favorable optical performance suitable for an imaging device having a large number of pixels are achieved.

It is to be understood that both the foregoing general description and the following detailed description are exemplary, and are intended to provide further explanation of the technology as claimed.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the technology.

DETAILED DESCRIPTION

Figure 1:
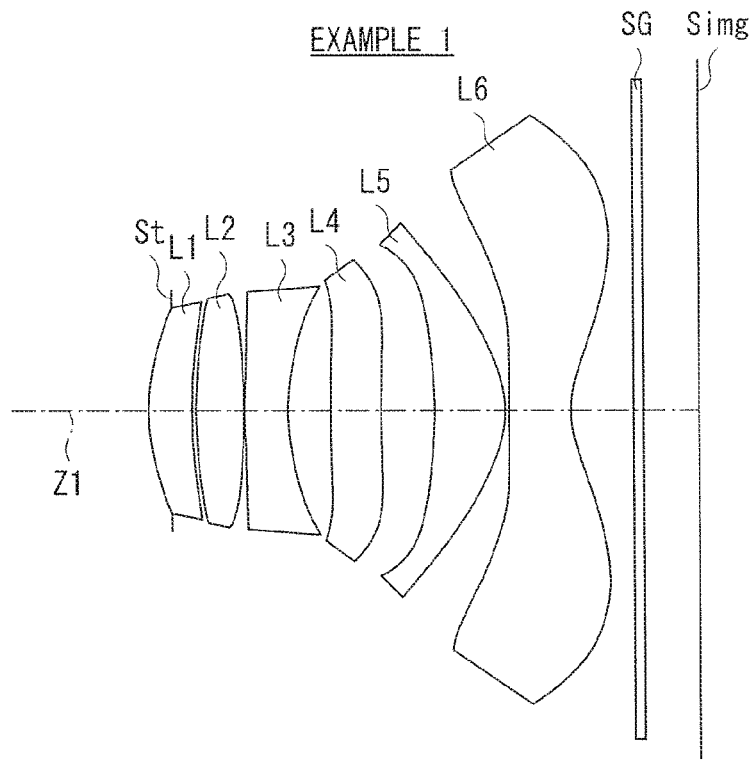
FIG. 1 illustrates a first configuration example of an imaging lens according to an embodiment of the present disclosure, and is a lens cross-sectional view corresponding to Numerical example 1.

Some embodiments of the present disclosure will be described below in detail referring to the drawings. The description will be given in the following order.
1. Basic Configuration of Lens
2. Functions and Effects
3. Application Example to Imaging Apparatus
4. Numerical Examples of Lens
5. Other Embodiments 1. Basic Configuration of Lens FIG. 1 illustrates a first configuration example of an imaging lens according to an embodiment of the present disclosure. The first configuration example corresponds to a lens configuration in Numerical example 1 which will be described later. Similarly, FIGS. 2 to 6 illustrate cross-sectional configurations of second to sixth configuration examples corresponding to Numerical examples 2 to 6, respectively, which will be described later. In FIGS. 1 to 6, a symbol "Simg" represents image plane (or an imaging device), and Z1 represents an optical axis.

The imaging lens according to the present embodiment is substantially configured of six lenses that are a first lens L1, a second lens L2, a third lens L3, a fourth lens L4, a fifth lens L5, and a sixth lens L6, that are arranged along the optical axis Z1 in order from object plane.

The first lens L1 has positive refractive power. The second lens L2 has positive refractive power. The third lens L3 has negative refractive power. The fourth lens L4 has positive refractive power. The fifth lens L5 has positive refractive power.

The sixth lens L6 has negative refractive power in vicinity of the optical axis, and has positive refractive power in a peripheral portion. In the sixth lens L6, one or both of an object-sided surface and an image-sided surface may preferably have an aspherical shape that has an inflection point that allows a concave-convex shape to vary in a way from a central portion to the peripheral portion. Also, the sixth lens L6 may preferably have one or more inflection points other than a point intersecting with the optical axis Z1.

An image-sided surface of the second lens L2 may preferably have a convex shape facing toward the image plane. An aperture stop St may be preferably arranged closer to the object plane than the image-sided surface of the second lens L2 is. All of the first to sixth lenses L1 to L6 may be preferably made of resin.

In addition to the above, the imaging lens according to the present embodiment may preferably satisfy predetermined conditional expressions, etc. that will be described later.

2. Functions and Effects

Next, description will be given on functions and effects of the imaging lens according to the present embodiment.

This imaging lens has a six-lens configuration as a whole, and the configuration of each lens is optimized. Therefore, compact size and favorable optical performance suitable for the imaging device having a large number of pixels are achieved. In particular, by adopting a power arrangement of positive, positive, negative, positive, positive, and negative in order from the object plane, a spherical aberration which is an on-axial aberration, a coma aberration which is an off-axial aberration, a field curvature, etc. that may be an issue when the aperture is increased are corrected with favorable balance, while suppressing increase in the optical total length. Further, the sixth lens L6 has an aspherical surface that has negative refractive power in the vicinity of the optical axis and has positive refractive power in the peripheral portion. Therefore, light rays are allowed to enter the imaging device at an appropriate angle, and the imaging lens is allowed to be suitable for the imaging device having a large number of pixels. In particular, the imaging lens is effective in correction of the field curvature.

Moreover, by configuring all of the first to sixth lenses L1 to L6 of lenses made of resin which is inexpensive, it is possible to suppress variation in the field curvature which may be an issue when a temperature varies, while securing mass-production characteristics.

Figure 2:
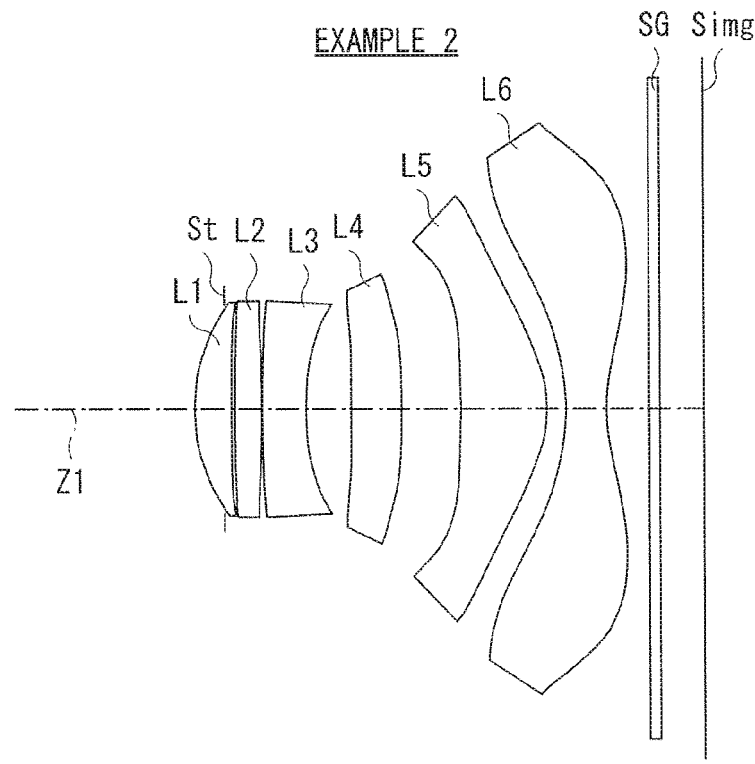
FIG. 2 illustrates a second configuration example of the imaging lens, and is a cross-sectional view of a lens corresponding to Numerical example 2.
Figure 3:
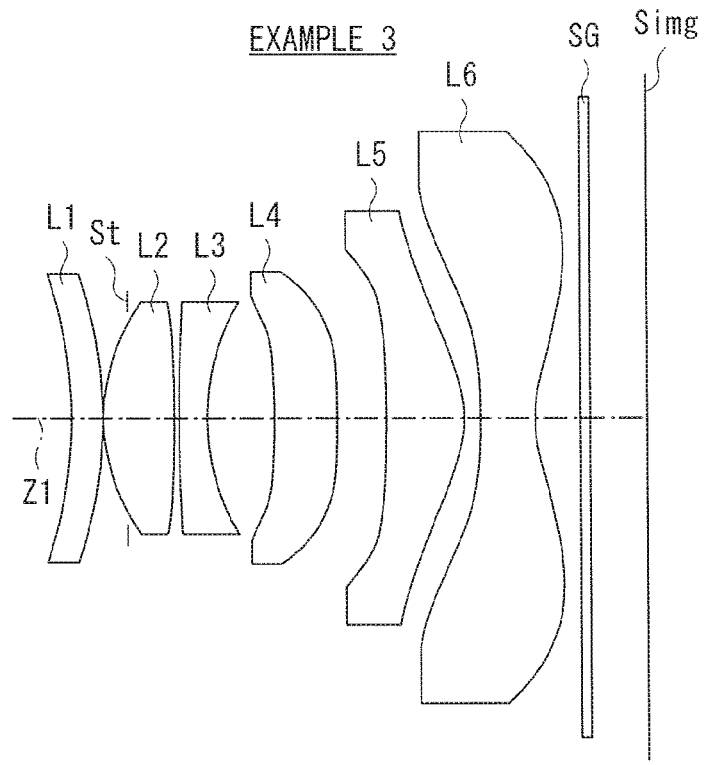
FIG. 3 illustrates a third configuration example of the imaging lens, and is a cross-sectional view of a lens corresponding to Numerical example 3.
Figure 4:
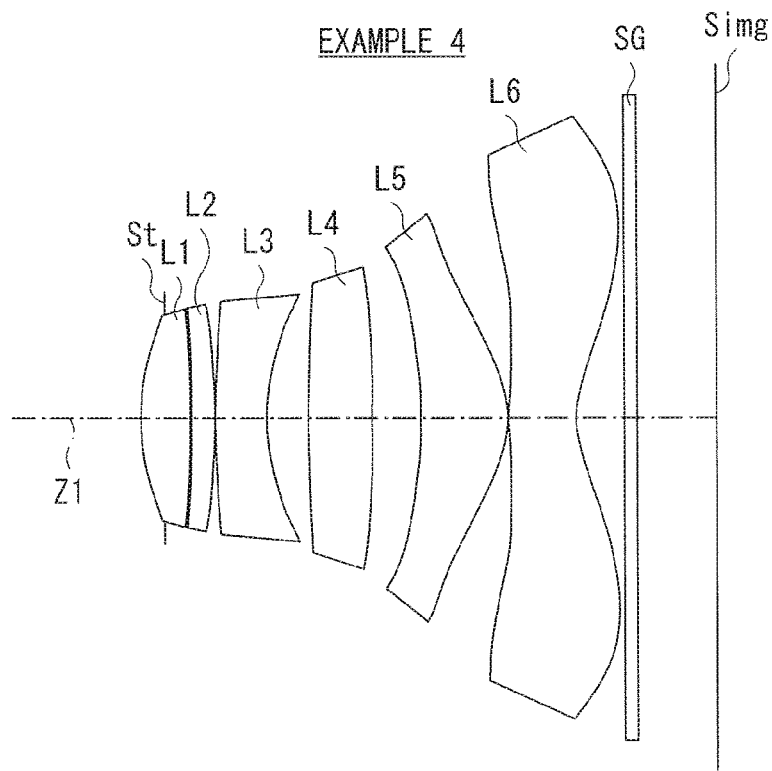
FIG. 4 illustrates a fourth configuration example of the imaging lens, and is a cross-sectional view of a lens corresponding to Numerical example 4.

In this imaging lens, when the first lens L1 is configured to have a convex surface facing toward the object plane as in the configuration examples shown in FIGS. 1, 2, and 4, it becomes easier to favorably correct an aberration in a central portion of the screen, in particular. Further, when the first lens L1 is configured to have a concave surface facing toward the object plane as in the configuration examples shown in FIGS. 3, 5, and 6, it becomes easier to favorably correct an aberration in a peripheral portion of the screen.

(Description of Conditional Expressions)

In the imaging lens according to the present embodiment, it is possible to obtain a more-favorable performance by optimizing the configuration of each lens to allow at least one conditional expression and, preferably, two or more conditional expressions in combination out of the following conditional expressions to be satisfied. In particular, it is possible to achieve a compact imaging lens that has a large aperture and has a favorable optical performance suitable for the imaging device having a large number of pixels.

$$vd2 > 50 \quad (1)$$

$$vd4 > 50 \quad (2)$$

In Conditional expressions (1) and (2) above, vd2 is an Abbe number of a d-line of the second lens L2, and vd4 is an Abbe number of a d-line of the fourth lens L4.

Conditional expressions (1) and (2) define the Abbe numbers of the d-lines of the second lens L2 and the fourth lens L4. By using glass materials that have Abbe numbers that satisfy Conditional expressions (1) and (2) to configure the second lens L2 and the fourth lens L4, it is possible to perform favorable correction of a chromatic aberration. When the Abbe number is out of the range of value specified by Conditional expressions (1) and (2), it becomes difficult to perform correction of an on-axial chromatic aberration which is necessary for increasing the aperture up to about F number of 2.0.

$$vd1>50 \quad (3)$$

$$vd3<30 \quad (4)$$

$$vd5>50 \quad (5)$$

$$vd6>50 \quad (6)$$

In Conditional expressions (3) to (6) above, vd1 is an Abbe number of a d-line of the first lens L1, vd3 is an Abbe number of a d-line of the third lens L3, vd5 is an Abbe number of a d-line of the fifth lens L5, and vd6 is an Abbe number of a d-line of the sixth lens L6.

Conditional expressions (3) to (6) define the Abbe numbers of the d-lines of the first lens L1, the third lens L3, the fifth lens L5, and the sixth lens L6. By using glass materials that have Abbe numbers that satisfy Conditional expressions (3) to (6) to configure the first lens L1, the third lens L3, the fifth lens L5, and the sixth lens L6, it is possible to perform favorable correction of a chromatic aberration. When the Abbe number is out of the range of value specified by Conditional expressions (3) to (6), it becomes difficult to perform correction of an on-axial chromatic aberration and of an off-axial magnification chromatic aberration which is necessary for increasing the aperture up to about F number of 2.0.

$$0<f/f1<1.32 \quad (7)$$

In Conditional expression (7) above, f is a total focal length of the imaging lens, and f1 is a focal length of the first lens L1.

Conditional expression (7) is for appropriately setting the focal length of the first lens L1, and for appropriately achieving reduction in optical total length and correction of aberrations. By allowing a value of f/f1 to be larger than the lower limit in Conditional expression (7), the focal length of the first lens L1 is maintained appropriately, and the reduction in the optical total length is achieved. On the other hand, by allowing the value of f/f1 to be smaller than the upper limit in Conditional expression (7), the focal length of the first lens L1 does not become excessively small, and aberrations such as a high-order spherical aberration and a coma aberration are suppressed.

When the first lens L1 is configured to have the convex surface facing toward the object plane as in the configuration examples shown in FIGS. 1, 2, and 4, a numerical range of Conditional expression (7) may be preferably set as in the following Conditional expression (7)'.

$$0.50<f/f1<1.32 \quad (7)'$$

$$0.2<f/f2<1.58 \quad (8)$$

In Conditional expression (8) above, f2 is a focal length of the second lens L2.

Conditional expression (8) is for appropriately setting the focal length of the second lens L2, and for appropriately achieving reduction in optical total length and correction of aberrations. By allowing a value of f/f2 to be larger than the lower limit in Conditional expression (8), the focal length of the second lens L2 is maintained appropriately, and the reduction in the optical total length is achieved. On the other hand, by allowing the value of f/f2 to be smaller than the upper limit in Conditional expression (8), the focal length of the second lens L2 does not become excessively small, and aberrations such as a high-order spherical aberration and a coma aberration are suppressed.

$$-1.09<f/f3<-0.82 \quad (9)$$

In Conditional expression (9) above, f3 is a focal length of the third lens L3.

Conditional expression (9) relates to an appropriate focal length of the third lens L3. By allowing a value of f/f3 to be smaller than the upper limit in Conditional expression (9), on-axial and off-axial chromatic aberrations are corrected moderately. On the other hand, by allowing the value of f/f3 to be larger than the lower limit in Conditional expression (9), the power of the third lens L3 is weakened, and thereby, manufacturing error sensitivity at the time of assembling is decreased.

$$1.19<f/f5<2.18 \quad (10)$$

In Conditional expression (10) above, f5 is a focal length of the fifth lens L5.

Conditional expression (10) relates to an appropriate focal length of the fifth lens L5. By allowing a value of f/f5 to be larger than the lower limit in Conditional expression (10), on-axial and off-axial aberrations are corrected with favorable balance. On the other hand, by allowing the value of f/f5 to be smaller than the upper limit in Conditional expression (10), the focal length of the fifth lens L5 is maintained appropriately, and thereby, the reduction in the optical total length is achieved.

$$-26<(r2+r1)/(r2-r1)<0 \quad (11)$$

In Conditional expression (11) above, r1 is a curvature radius of an object-sided surface of the first lens L1, and r2 is a curvature radius of an image-sided surface of the first lens L1.

Conditional expression (11) relates to a relationship between the curvature radius of the object-sided surface of the first lens L1 and the curvature radius of the image-sided surface of the first lens L1. In particular, when the first lens L1 is configured to have a concave surface facing toward the object plane as in the configuration example shown in FIG. 3, etc., by allowing both of Conditional expressions (7) and (11) to be satisfied, aberrations in the peripheral portion of the screen are favorably corrected while reducing the optical total length.

3. Application Example to Imaging Apparatus

Figure 13:
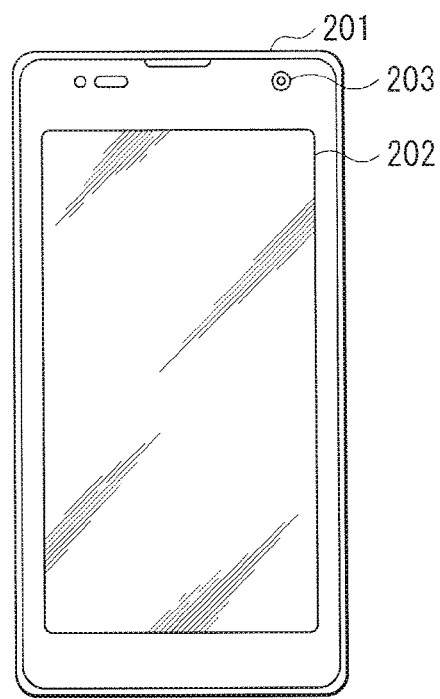
FIG. 13 is a front view illustrating a configuration example of an imaging apparatus.
Figure 14:
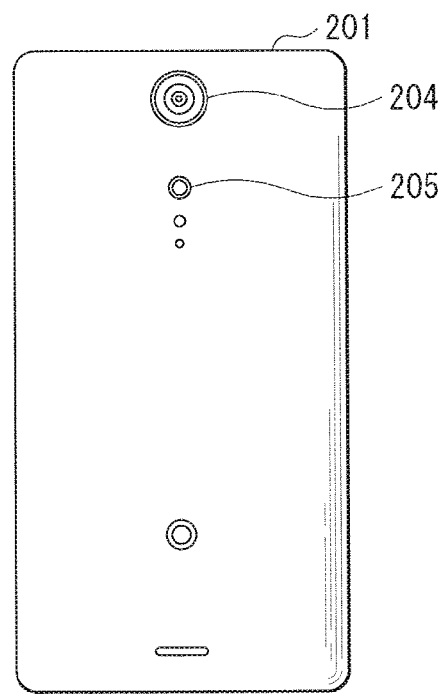
FIG. 14 is a back view illustrating a configuration example of the imaging apparatus.

FIGS. 13 and 14 illustrate a configuration example of an imaging apparatus to which the imaging lens according to the present embodiment is applied. This configuration example is an example of a mobile terminal apparatus (such as a mobile information terminal and a mobile phone terminal) that includes an imaging apparatus. This mobile terminal apparatus includes a housing 201 that has a substantially-rectangular shape. Components such as a display section 202 and a front camera section 203 are provided on the front surface side of the housing 201 (FIG. 13). Components such as a main camera section 204 and a camera flash 205 are provided on the back surface side of the housing 201 (FIG. 14).

The display section 202 may be, for example, a touch panel that allows various operations to be performed by detecting a contact state to the front surface. Therefore, the display section 202 has a function of displaying various types of information and an input function of allowing various input operations by a user to be performed. The display section 202 displays various types of data such as an operation state and an image shot by the front camera section 203 or the main camera section 204.

The imaging lens according to the present embodiment may be applicable, for example, as a lens for a camera module of the imaging apparatus (the front camera section 203 or the main camera section 204) in the mobile terminal apparatus shown in FIGS. 13 and 14. When the imaging lens according to the present embodiment is used as such a lens for the camera module, an imaging device such as a CCD (Charge Coupled Device) and a CMOS (Complementary Metal Oxide Semiconductor) that outputs an imaging signal (an image signal) in accordance with an optical image formed by the imaging lens is arranged near the image plane Simg of the imaging lens. In this case, as shown in FIG. 1, an optical member such as a sealing glass SG for protection of the imaging device and various optical filters may be arranged between the sixth lens L6 and the image plane Simg.

It is to be noted that the imaging lens according to the present embodiment is applicable not limitedly to the above-described mobile terminal apparatus, and is applicable, for example, as an imaging lens for other electronic apparatuses such as a digital still camera and a digital video camcorder. In addition thereto, the imaging lens according to the present embodiment is applicable to general compact imaging apparatuses that use a solid-state imaging device such as a CCD and a CMOS. Examples of such general compact image apparatuses may include, an optical sensor, a mobile module camera, and a WEB camera.

EXAMPLES

4. Numerical Examples of Lens

Next, description will be given on specific numerical examples of the imaging lens according to the present embodiment.

It is to be noted that symbols etc. in the tables and the description below represent the following. "Si" represents the number of an i-th surface counted from the object plane side. It is to be noted that a surface denoted with "ASP" in the box of the surface number Si is an aspherical surface. "Ri" represents a value (mm) of a paraxial curvature radius of the i-th surface. "di" represents a value (mm) of a spacing on the optical axis between the i-th surface and the (i+1)th surface counted from the object plane side. "ni" represents a value of a refractive index of the d-line (with a wavelength of 587.6 nm) of a material of an optical component that has the i-th surface. "vi" represents a value of an Abbe number of the d-line of the material of the optical component that has the i-th surface. Concerning the curvature radius, "∞" indicates that the related surface is a planar surface. "STO" indicates that the related surface is an aperture stop surface. "IMG" indicates that the related surface is the image plane. f represents a total focal length of the imaging lens, "2ω" represents a total angle of view of diagonal corners, and FNo represents F number.

In each Example, a shape of an aspherical surface is expressed by the following expression. In data showing the aspherical surface coefficients, the symbol "E" indicates that a numerical value after "E" is "exponential expression" having 10 as a base, and indicates that a numerical value before "E" is multiplied by the numerical value represented by the exponential function having 10 as a base. To give an example, "1.0E-05" represents "1.0×10$^{-5}$".

(Expression for Aspherical Surface)

$$Z = (Y^2/R)/\left[1 + \{1 - (1+K)(Y^2/R^2)\}^{1/2}\right] + AY^3 + BY^4 + CY^5 + DY^6 + EY^7 + FY^8 + GY^9 + HY^{10} + IY^{11} + JY^{12} + KY^{13} + LY^{14} + MY^{15} + NY^{16}$$

In the above-described expression, Z is a depth of the aspherical surface, Y is a height from the optical axis, R is a paraxial curvature radius, and K is a conic constant.

Further, A, B, C, D, E, F, G, H, I, J, K, L, M, and N are aspherical surface coefficients of third-order, fourth-order, fifth-order, sixth-order, seventh-order, eighth-order, ninth-order, tenth-order, eleventh-order, twelfth-order, thirteenth-order, fourteenth-order, fifteenth-order, and sixteenth-order, respectively.

(Configuration Common to All of Numerical Examples)

Each of the imaging lenses according to the respective numerical examples below has a configuration that satisfies the above-described basic configuration of the lens. Further, in each of the imaging lenses according to the respective numerical examples, each of the lens surfaces of the first lens L1 to the sixth lens L6 is aspherical. The sealing glass SG is arranged between the sixth lens L6 and the image plane Simg.

Numerical Example 1

Table 1 and Table 2 show specific lens data corresponding to the imaging lens according to the first configuration example shown in FIG. 1. In particular, Table 1 shows basic lens data thereof, and Table 2 shows data related to the aspherical surfaces.

In the first configuration example, the first lens L1 has a meniscus shape that has a convex surface facing toward the object plane. A central portion of the fourth lens L4 has a meniscus shape that has a convex surface facing toward the object plane. The aperture stop St is provided in the vicinity of the object-sided surface of the first lens L1.

Values of F number, total angle of view 2ω of diagonal corners, and total focal length f of the imaging lens are as follows.

$FNo=2.06$ $f=3.70$ $2\omega=75.14°$

TABLE 1

Example 1

| Si | Ri | di | ni | vi |
|---|---|---|---|---|
| 1 | (STO) | −0.198 | | |
| 2(ASP) | 1.981 | 0.382 | 1.535 | 56.3 |
| 3(ASP) | 4.055 | 0.040 | | |
| 4(ASP) | 4.615 | 0.422 | 1.535 | 56.3 |
| 5(ASP) | −4.953 | 0.010 | | |
| 6(ASP) | 8.859 | 0.382 | 1.635 | 23.9 |
| 7(ASP) | 1.954 | 0.376 | | |
| 8(ASP) | 4.815 | 0.462 | 1.535 | 56.3 |
| 9(ASP) | 7.960 | 0.464 | | |
| 10(ASP) | −5.287 | 0.638 | 1.535 | 56.3 |
| 11(ASP) | −0.928 | 0.024 | | |
| 12(ASP) | 5.642 | 0.565 | 1.535 | 56.3 |
| 13(ASP) | 0.829 | 0.336 | | |
| 14 | ∞ | 0.110 | 1.512 | 56.9 |
| 15 | ∞ | 0.690 | | |
| 16 | (IMG) | | | |

TABLE 2

Example 1

| Si | K | A | B | C | D | E | F | G |
|---|---|---|---|---|---|---|---|---|
| 2 | −0.8617 | 0 | 1.296E−03 | 0 | −1.533E−02 | 0 | 1.2321E−02 | 0 |
| 3 | −12.4301 | 0 | −1.330E−02 | 0 | 3.906E−03 | 0 | −6.1924E−04 | 0 |
| 4 | −25.9415 | 0 | 8.072E−03 | 0 | 1.653E−03 | 0 | 4.2467E−03 | 0 |
| 5 | −13.0250 | 0 | 5.271E−02 | 0 | −6.330E−02 | 0 | −1.9296E−02 | 0 |
| 6 | −1.2102 | −1.215E−02 | 1.758E−03 | −2.640E−02 | 5.590E−02 | 1.3909E−02 | −1.0298E−01 | −5.1181E−03 |
| 7 | −8.9406 | −2.986E−03 | 2.467E−02 | 7.369E−04 | 4.570E−02 | 1.3434E−02 | −5.0294E−02 | −4.4869E−03 |
| 8 | −20.4735 | −1.276E−02 | −6.545E−02 | −1.977E−02 | 2.168E−02 | −1.3535E−02 | −4.8685E−03 | −8.0759E−04 |
| 9 | −30.0000 | −1.968E−02 | −4.417E−02 | 7.848E−04 | −1.659E−02 | −4.6933E−03 | −4.0744E−03 | −1.5076E−03 |
| 10 | 11.8367 | −3.242E−02 | 1.020E−02 | 7.993E−03 | −5.799E−03 | 3.5110E−03 | −5.5113E−03 | −2.8732E−03 |
| 11 | −4.0946 | −4.969E−02 | −3.625E−02 | 4.346E−03 | 2.203E−02 | −2.7104E−03 | −2.3517E−03 | −8.4823E−04 |
| 12 | 1.6880 | −6.934E−02 | −9.300E−02 | 8.472E−03 | 1.586E−02 | 1.0160E−03 | −1.6525E−04 | −4.8738E−05 |
| 13 | −4.1530 | −1.012E−01 | −9.764E−03 | 2.410E−02 | −5.294E−03 | −6.7224E−04 | −8.0567E−04 | 1.4985E−04 |

| Si | H | I | J | K | L | M | N |
|---|---|---|---|---|---|---|---|
| 2 | −1.5939E−02 | 0 | 0 | 0 | 0 | 0 | 0 |
| 3 | 1.8087E−03 | 0 | 0 | 0 | 0 | 0 | 0 |
| 4 | 5.2617E−04 | 0 | 0 | 0 | 0 | 0 | 0 |
| 5 | 1.3312E−02 | 0 | 0 | 0 | 0 | 0 | 0 |
| 6 | 4.5688E−02 | 0 | 0 | 0 | 0 | 0 | 0 |
| 7 | 1.9886E−02 | 0 | 0 | 0 | 0 | 0 | 0 |
| 8 | 4.5331E−03 | 0 | 0 | 0 | 0 | 0 | 0 |
| 9 | 2.8163E−03 | −4.6589E−04 | −6.2345E−04 | −7.1444E−04 | −1.4749E−04 | −5.6256E−05 | 4.5925E−04 |
| 10 | −1.4080E−03 | −3.2309E−05 | 4.1542E−04 | 0 | 0 | 0 | 0 |
| 11 | −4.0215E−04 | 5.9404E−06 | 2.7142E−04 | 0 | 0 | 0 | 0 |
| 12 | −2.0015E−04 | −8.2150E−06 | 1.2240E−05 | 9.0073E−08 | −2.1052E−07 | 0 | 0 |
| 13 | 1.5030E−04 | −3.5672E−05 | 9.6189E−06 | −6.9666E−06 | 1.2133E−06 | 0 | 0 |

Numerical Example 2

Table 3 and Table 4 show specific lens data corresponding to the imaging lens according to the second configuration example shown in FIG. 2. In particular, Table 3 shows basic lens data thereof, and Table 4 shows data related to the aspherical surfaces.

In the second configuration example, the first lens L1 has a meniscus shape that has a convex surface facing toward the object plane. The fourth lens L4 has a biconvex shape. The aperture stop St is provided in the vicinity of the object-sided surface of the first lens L1.

Values of F number, total angle of view 2ω of diagonal corners, and total focal length f of the imaging lens are as follows.

*FNo*=2.08

*f*=4.83

2ω=77.12°

TABLE 3

Example 2

| Si | Ri | di | ni | vi |
|---|---|---|---|---|
| 1 | (STO) | −0.338 | | |
| 2(ASP) | 1.996 | 0.419 | 1.535 | 56.3 |
| 3(ASP) | 23.112 | 0.036 | | |
| 4(ASP) | 23.837 | 0.300 | 1.535 | 56.3 |
| 5(ASP) | −13.879 | 0.010 | | |
| 6(ASP) | 16.329 | 0.491 | 1.635 | 23.9 |
| 7(ASP) | 2.632 | 0.517 | | |
| 8(ASP) | 22.320 | 0.581 | 1.535 | 56.3 |
| 9(ASP) | −11.228 | 0.677 | | |
| 10(ASP) | −13.902 | 0.987 | 1.535 | 56.3 |
| 11(ASP) | −1.229 | 0.208 | | |
| 12(ASP) | −3.133 | 0.453 | 1.535 | 56.3 |
| 13(ASP) | 1.435 | 0.306 | | |
| 14 | ∞ | 0.110 | 1.512 | 56.9 |
| 15 | ∞ | 0.690 | | |
| 16 | (IMG) | | | |

TABLE 4

Example 2

| Si | K | A | B | C | D | E | F | G |
|---|---|---|---|---|---|---|---|---|
| 2 | −0.3410 | 0 | 7.994E−03 | 0 | −3.788E−03 | 0 | 6.8373E−03 | 0 |
| 3 | −29.9006 | 0 | −1.926E−04 | 0 | 9.154E−05 | 0 | 2.1112E−04 | 0 |
| 4 | 30.0000 | 0 | 3.117E−04 | 0 | 1.305E−04 | 0 | 2.8125E−05 | 0 |
| 5 | −17.7553 | 0 | 3.444E−02 | 0 | −3.747E−03 | 0 | −1.2316E−02 | 0 |
| 6 | −0.2953 | 2.305E−03 | 2.601E−03 | −4.556E−03 | 2.167E−02 | 2.2209E−03 | −2.2364E−02 | −5.8533E−03 |
| 7 | −6.8600 | 3.475E−03 | 1.840E−02 | 8.559E−03 | 1.402E−02 | 3.3865E−03 | −1.2066E−02 | −2.3308E−03 |
| 8 | −7.6143 | 1.176E−03 | −2.891E−02 | −2.006E−02 | 1.687E−02 | −1.4892E−03 | −4.5131E−03 | −1.2077E−03 |
| 9 | 10.5424 | 2.765E−02 | −7.323E−02 | 2.416E−02 | −2.873E−03 | −6.7161E−03 | 3.8122E−04 | 1.1421E−03 |
| 10 | −4.0910 | 3.766E−03 | 9.593E−04 | −3.350E−02 | 1.683E−02 | 2.9390E−03 | −3.8522E−03 | −2.0263E−03 |

TABLE 4-continued

| | | | Example 2 | | | | |
|---|---|---|---|---|---|---|---|
| 11 | −6.3536 | −4.117E−02 | −2.677E−02 | 2.873E−02 | 3.098E−03 | −3.5163E−03 | −9.7536E−04 | 1.5006E−04 |
| 12 | −7.0068 | −2.407E−02 | −2.582E−02 | 4.076E−03 | 4.791E−03 | 3.9756E−05 | −7.1252E−05 | −3.7548E−05 |
| 13 | −9.3407 | −4.510E−02 | −5.684E−03 | 8.439E−03 | −1.635E−03 | −1.1619E−04 | −1.2351E−04 | 6.5176E−06 |

| | H | I | J | K | L | M | N |
|---|---|---|---|---|---|---|---|
| 2 | −2.9976E−03 | 0 | 0 | 0 | 0 | 0 | 0 |
| 3 | 1.4147E−05 | 0 | 0 | 0 | 0 | 0 | 0 |
| 4 | 2.9762E−06 | 0 | 0 | 0 | 0 | 0 | 0 |
| 5 | 2.1695E−04 | 0 | 1.5976E−03 | 0 | 0 | 0 | 0 |
| 6 | 5.4862E−03 | 1.8431E−03 | 9.3873E−04 | 0 | 0 | 0 | 0 |
| 7 | 7.8702E−03 | 0 | 0 | 0 | 0 | 0 | 0 |
| 8 | 2.3033E−03 | 1.7294E−03 | 0 | 0 | 0 | 0 | 0 |
| 9 | 7.0671E−04 | −2.4331E−04 | −1.8342E−04 | −4.3257E−04 | 4.1664E−04 | 4.8172E−04 | −2.5342E−04 |
| 10 | 4.1900E−04 | 3.5702E−04 | −3.3945E−05 | 0 | 0 | 0 | 0 |
| 11 | 5.7611E−05 | 6.9284E−05 | 6.5205E−07 | −9.0369E−06 | 0 | 0 | 0 |
| 12 | −2.0484E−05 | −1.6361E−06 | 1.7034E−07 | 7.8479E−08 | 1.2520E−07 | 0 | 0 |
| 13 | 1.5030E−04 | −3.5672E−05 | 9.6189E−06 | −6.9666E−06 | 1.2133E−06 | 0 | 0 |

Numerical Example 3

Table 5 and Table 6 show specific lens data corresponding to the imaging lens according to the third configuration example shown in FIG. 3. In particular, Table 5 shows basic lens data thereof, and Table 6 shows data related to the aspherical surfaces.

In the third configuration example, the first lens L1 has a meniscus shape that has a concave surface facing toward the object plane. The central portion of the fourth lens L4 has a meniscus shape that has a concave surface facing toward the object plane. The aperture stop St is arranged between the first lens L1 and the second lens L2

Values of F number, total angle of view 2ω of diagonal corners, and total focal length f of the imaging lens are as follows.

$FNo=2.08$ $f=5.13$ $2\omega=77.44°$

TABLE 5

| | Example 3 | | | |
|---|---|---|---|---|
| Si | Ri | di | ni | vi |
| 1(ASP) | −5.78 | 0.381 | 1.535 | 56.3 |
| 2(ASP) | −5.299 | 0.310 | | |
| 3 | (STO) | −0.300 | | |
| 4(ASP) | 2.280 | 0.848 | 1.535 | 56.3 |
| 5(ASP) | −12.658 | 0.060 | | |
| 6(ASP) | 15.944 | 0.344 | 1.635 | 23.9 |
| 7(ASP) | 2.885 | 0.792 | | |
| 8(ASP) | −32.761 | 0.756 | 1.535 | 56.3 |
| 9(ASP) | −11.405 | 0.578 | | |
| 10(ASP) | −23.551 | 0.939 | 1.535 | 56.3 |
| 11(ASP) | −1.425 | 0.199 | | |
| 12(ASP) | −8.212 | 0.641 | 1.535 | 56.3 |
| 13(ASP) | 1.383 | 0.356 | | |
| 14 | ∞ | 0.110 | 1.512 | 56.9 |
| 15 | ∞ | 0.872 | | |
| 16 | (IMG) | | | |

TABLE 6

| | | | | Example 3 | | | | |
|---|---|---|---|---|---|---|---|---|
| Si | K | A | B | C | D | E | F | G |
| 1 | 0.0000 | 0 | −3.471E−03 | 0 | −6.404E−04 | 0 | 2.9423E−04 | 0 |
| 2 | 0.0000 | 0 | −4.662E−03 | 0 | 5.526E−04 | 0 | 9.5585E−05 | 0 |
| 4 | −0.4300 | 0 | 4.860E−03 | 0 | −1.459E−03 | 0 | 1.7097E−03 | 0 |
| 5 | 6.4540 | 0 | 2.059E−02 | 0 | −5.282E−03 | 0 | −5.2592E−03 | 0 |
| 6 | −10.3220 | −5.836E−03 | 4.167E−03 | −2.389E−03 | 1.558E−02 | 1.9093E−03 | −1.3943E−02 | −2.9180E−03 |
| 7 | −7.0928 | −3.196E−03 | 1.999E−02 | 6.073E−03 | 1.148E−02 | 1.6518E−03 | −8.0773E−03 | −3.9791E−04 |
| 8 | −9.9941 | −1.159E−02 | −2.576E−02 | −1.101E−02 | 5.450E−03 | −3.2302E−03 | −1.1756E−03 | 1.3714E−04 |
| 9 | 10.0000 | 2.547E−03 | −5.128E−02 | 5.528E−03 | −3.320E−03 | −1.8918E−03 | −4.1040E−05 | 2.0296E−04 |
| 10 | −10.0000 | −6.489E−03 | 6.586E−03 | −1.203E−02 | 2.904E−03 | 1.0013E−03 | −1.5770E−03 | −6.5476E−04 |
| 11 | −5.4633 | −1.665E−02 | −1.651E−02 | 1.691E−02 | 3.573E−03 | −1.8307E−03 | −6.4538E−04 | −4.0080E−06 |
| 12 | −3.8607 | −2.342E−02 | −2.409E−02 | 3.049E−03 | 3.688E−03 | 4.6309E−05 | −3.1208E−05 | −2.0930E−05 |
| 13 | −5.6468 | −5.680E−02 | 4.914E−03 | 2.870E−03 | −7.238E−04 | 7.5703E−05 | −7.6661E−05 | 2.6549E−06 |

| | H | I | J | K | L | M | N |
|---|---|---|---|---|---|---|---|
| 1 | 9.6036E−05 | 0 | 1.07091E−05 | 0 | −6.59718E−06 | 0 | 0 |
| 2 | 1.5897E−04 | 0 | 4.10946E−05 | 0 | −1.68936E−05 | 0 | 0 |
| 4 | −6.2548E−04 | 0 | 0 | 0 | 0 | 0 | 0 |
| 5 | 8.9359E−04 | 0 | 0.000262733 | 0 | 0 | 0 | 0 |

TABLE 6-continued

Example 3

| | | | | | | | |
|---|---|---|---|---|---|---|---|
| 6 | 3.5659E−03 | 0 | 0.000259485 | 0 | 0 | 0 | 0 |
| 7 | 2.0494E−03 | 0 | 0 | 0 | 0 | 0 | 0 |
| 8 | 3.8878E−04 | −1.6616E−04 | 0 | 0 | 0 | 0 | 0 |
| 9 | 1.3546E−04 | −1.2185E−04 | −7.2794E−05 | −5.1607E−05 | 6.5220E−05 | 4.8525E−05 | −3.3452E−05 |
| 10 | 2.5099E−04 | 2.5770E−04 | −9.8453E−05 | 0 | 0 | 0 | 0 |
| 11 | −8.0282E−06 | 2.9561E−05 | 5.8157E−06 | −2.30212E−06 | 0 | 0 | 0 |
| 12 | −1.2594E−05 | −1.4606E−06 | −1.3681E−07 | 4.1895E−08 | 1.0267E−07 | 0 | 0 |
| 13 | 3.2698E−06 | −4.8317E−07 | 5.5093E−08 | −1.6351E−08 | 7.3116E−09 | 0 | 0 |

Numerical Example 4

Table 7 and Table 8 show specific lens data corresponding to the imaging lens according to the fourth configuration example shown in FIG. 4. In particular, Table 7 shows basic lens data thereof, and Table 8 shows data related to the aspherical surfaces.

In the fourth configuration example, the first lens L1 has a biconvex shape. The central portion of the fourth lens L4 has a meniscus shape that has a convex surface facing toward the object plane. The aperture stop St is provided in the vicinity of the object-sided surface of the first lens L1.

Values of F number, total angle of view $2\omega$ of diagonal corners, and total focal length f of the imaging lens are as follows.

$FNo=2.11$ $f=3.79$ $2\omega=73.42°$

TABLE 7

Example 4

| Si | Ri | di | ni | vi |
|---|---|---|---|---|
| 1 | (STO) | −0.199 | | |
| 2(ASP) | 2.041 | 0.427 | 1.535 | 56.3 |
| 3(ASP) | −13.626 | 0.010 | | |
| 4(ASP) | −13.465 | 0.202 | 1.535 | 56.3 |
| 5(ASP) | −5.281 | 0.013 | | |
| 6(ASP) | 8.217 | 0.444 | 1.635 | 23.9 |
| 7(ASP) | 1.850 | 0.363 | | |
| 8(ASP) | 7.185 | 0.548 | 1.535 | 56.3 |
| 9(ASP) | 93.905 | 0.418 | | |
| 10(ASP) | −3.820 | 0.757 | 1.535 | 56.3 |
| 11(ASP) | −0.889 | 0.020 | | |
| 12(ASP) | 6.409 | 0.579 | 1.535 | 56.3 |
| 13(ASP) | 0.823 | 0.418 | | |
| 14 | ∞ | 0.110 | 1.512 | 56.9 |
| 15 | ∞ | 0.690 | | |
| 16 | (IMG) | | | |

TABLE 8

Example 4

| Si | K | A | B | C | D | E | F | G |
|---|---|---|---|---|---|---|---|---|
| 2 | −0.5755 | 0 | 6.996E−03 | 0 | −1.976E−02 | 0 | 2.5359E−02 | 0 |
| 3 | −1.7305 | 0 | 1.759E−04 | 0 | 1.027E−05 | 0 | 1.0437E−04 | 0 |
| 4 | 0.6562 | 0 | −4.622E−05 | 0 | 1.422E−04 | 0 | 2.1988E−05 | 0 |
| 5 | −9.2255 | 0 | 6.592E−02 | 0 | −4.604E−02 | 0 | −1.9209E−02 | 0 |
| 6 | −6.9802 | −1.251E−02 | 1.987E−02 | −2.190E−02 | 5.476E−02 | 1.2144E−02 | −1.0328E−01 | −4.7995E−03 |
| 7 | −8.7374 | 1.168E−02 | 3.247E−02 | −6.523E−04 | 3.892E−02 | 5.3518E−03 | −5.1791E−02 | −4.7142E−03 |
| 8 | 4.6478 | −4.618E−03 | −5.277E−02 | −1.719E−02 | 2.498E−02 | −9.2709E−03 | 5.5408E−04 | 3.6340E−03 |
| 9 | −30.0000 | 1.237E−03 | −3.568E−02 | 8.185E−03 | −1.495E−02 | −5.8768E−03 | −3.0732E−03 | −1.6443E−04 |
| 10 | 0.2823 | 9.740E−04 | 3.802E−02 | 6.131E−03 | −1.209E−02 | 2.4927E−04 | −5.1329E−03 | −2.3564E−03 |
| 11 | −4.3482 | −3.195E−02 | −2.189E−02 | 8.425E−03 | 2.405E−02 | −1.3559E−02 | −2.2491E−03 | −6.1068E−05 |
| 12 | 4.6802 | −1.194E−02 | −8.092E−02 | 2.864E−03 | 1.537E−03 | −2.3015E−04 | −1.3078E−04 | −8.2921E−05 |
| 13 | −4.5659 | −1.014E−01 | 3.151E−02 | −6.597E−03 | −2.240E−04 | 8.6769E−04 | −4.6926E−04 | 1.3031E−05 |

| Si | H | I | J | K | L | M | N |
|---|---|---|---|---|---|---|---|
| 2 | −2.1897E−02 | 0 | 0 | 0 | 0 | 0 | 0 |
| 3 | −3.4562E−04 | 0 | 0 | 0 | 0 | 0 | 0 |
| 4 | 4.4575E−04 | 0 | 0 | 0 | 0 | 0 | 0 |
| 5 | 5.3499E−03 | 0 | 0 | 0 | 0 | 0 | 0 |
| 6 | 4.4971E−02 | 0 | 0 | 0 | 0 | 0 | 0 |
| 7 | 2.3461E−02 | 0 | 0 | 0 | 0 | 0 | 0 |
| 8 | 8.0974E−03 | 0 | 0 | 0 | 0 | 0 | 0 |
| 9 | 4.1904E−03 | 4.4727E−04 | 4.5360E−04 | −3.8219E−06 | 5.0953E−04 | 1.0452E−04 | 3.6609E−04 |
| 10 | −6.8942E−04 | 2.4790E−04 | 9.8924E−04 | 0 | 0 | 0 | 0 |
| 11 | −4.9763E−04 | 1.0540E−05 | −9.5178E−06 | 0 | 0 | 0 | 0 |
| 12 | −1.4159E−04 | −3.1816E−06 | 1.3513E−06 | 6.4596E−07 | 1.0301E−06 | 0 | 0 |
| 13 | 2.1606E−05 | −1.6196E−05 | 2.5063E−06 | 4.1756E−07 | 2.6286E−07 | 0 | 0 |

Numerical Example 5

Figure 5:
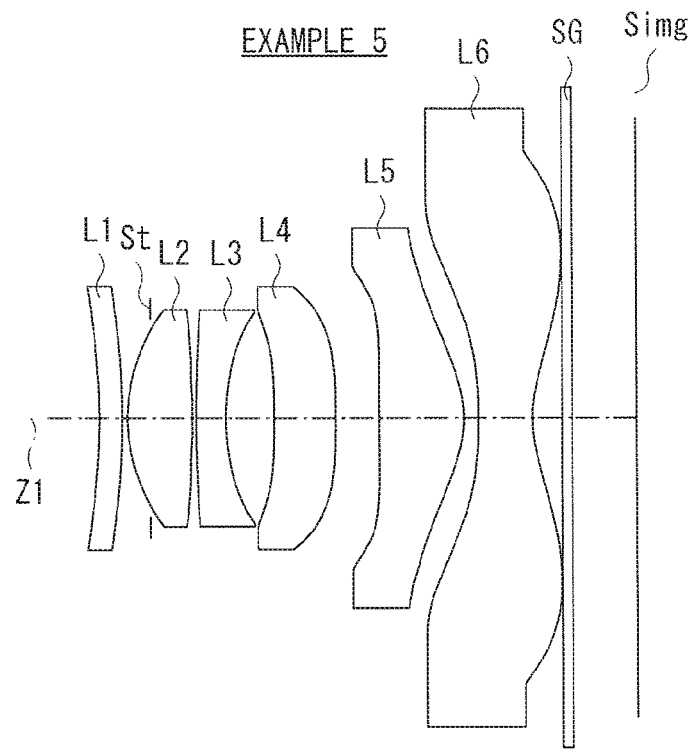
FIG. 5 illustrates a fifth configuration example of the imaging lens, and is a cross-sectional view of a lens corresponding to Numerical example 5.

Table 9 and Table 10 show specific lens data corresponding to the imaging lens according to the fifth configuration example shown in FIG. 5. In particular, Table 9 shows basic lens data thereof, and Table 10 shows data related to the aspherical surfaces.

In the fifth configuration example, the first lens L1 has a meniscus shape that has a concave surface facing toward the object plane. The central portion of the fourth lens L4 has a meniscus shape that has a concave surface facing toward the object plane. The aperture stop St is arranged between the first lens L1 and the second lens L2.

Values of F number, total angle of view $2\omega$ of diagonal corners, and total focal length f of the imaging lens are as follows.

$FNo=2.08$ $f=5.12$ $2\omega=72.42°$

TABLE 9

Example 5

| Si | Ri | di | ni | vi |
|---|---|---|---|---|
| 1(ASP) | −9.26 | 0.300 | 1.535 | 56.3 |
| 2(ASP) | −9.350 | 0.064 | | |
| 3 | (STO) | −0.300 | | |
| 4(ASP) | 2.198 | 0.823 | 1.535 | 56.3 |
| 5(ASP) | −12.392 | 0.058 | | |
| 6(ASP) | 16.194 | 0.378 | 1.635 | 23.9 |
| 7(ASP) | 2.907 | 0.602 | | |
| 8(ASP) | −32.273 | 0.788 | 1.535 | 56.3 |
| 9(ASP) | −12.085 | 0.570 | | |
| 10(ASP) | −47.754 | 1.058 | 1.535 | 56.3 |
| 11(ASP) | −1.472 | 0.182 | | |
| 12(ASP) | −8.948 | 0.688 | 1.535 | 56.3 |
| 13(ASP) | 1.380 | 0.391 | | |
| 14 | ∞ | 0.110 | 1.512 | 56.9 |
| 15 | ∞ | 0.800 | | |
| 16 | (IMG) | | | |

TABLE 10

Example 5

| Si | K | A | B | C | D | E | F | G |
|---|---|---|---|---|---|---|---|---|
| 1 | −2.225E+00 | 0 | −2.918E−03 | 0 | −5.383E−04 | 0 | 2.484E−04 | 0 |
| 2 | 1.397E+00 | 0 | −4.916E−03 | 0 | 5.408E−04 | 0 | 1.438E−04 | 0 |
| 4 | −4.286E−01 | 0 | 4.874E−03 | 0 | −1.158E−03 | 0 | 1.883E−03 | 0 |
| 5 | 2.346E+00 | 0 | 2.088E−02 | 0 | −5.259E−03 | 0 | −5.377E−03 | 0 |
| 6 | −1.050E+01 | −5.262E−03 | 3.634E−03 | −2.899E−03 | 1.544E−02 | 1.946E−03 | −1.386E−02 | −2.848E−03 |
| 7 | −7.325E+00 | −4.097E−03 | 2.034E−02 | 6.715E−03 | 1.195E−02 | 1.909E−03 | −7.954E−03 | −3.218E−04 |
| 8 | 1.000E+01 | −1.076E−02 | −2.706E−02 | −1.142E−02 | 5.841E−03 | −2.686E−03 | −8.200E−04 | 2.695E−04 |
| 9 | −2.297E+00 | 1.813E−03 | −5.016E−03 | 5.924E−03 | −3.205E−03 | −1.870E−03 | 7.082E−05 | 1.737E−06 |
| 10 | 9.989E+00 | −5.300E−03 | 6.268E−03 | −1.187E−02 | 3.049E−03 | 1.054E−03 | −1.557E−03 | −6.556E−04 |
| 11 | −5.588E+00 | −1.491E−02 | −1.622E−02 | 1.693E−02 | 3.578E−03 | −1.827E−03 | −6.431E−04 | −2.979E−06 |
| 12 | −4.387E+00 | −2.368E−02 | −2.397E−02 | 3.118E−03 | 3.719E−03 | 5.880E−05 | −2.808E−05 | −1.945E−05 |
| 13 | −5.366E+00 | −5.471E−02 | 4.565E−03 | 2.882E−03 | −7.054E−04 | 8.224E−05 | −7.461E−05 | 3.139E−06 |

| Si | H | I | J | K | L | M | N |
|---|---|---|---|---|---|---|---|
| 1 | 9.376E−05 | 0 | 1.211E−05 | 0 | −5.775E−06 | 0 | 0 |
| 2 | 1.674E−04 | 0 | 3.979E−05 | 0 | −1.388E−05 | 0 | 0 |
| 4 | −6.750E−04 | 0 | 0 | 0 | 0 | 0 | 0 |
| 5 | 9.394E−04 | 0 | 3.107E−04 | 0 | 0 | 0 | 0 |
| 6 | 3.614E−03 | 3.142E−04 | 2.609E−04 | 0 | 0 | 0 | 0 |
| 7 | 2.132E−03 | 2.965E−04 | 0 | 0 | 0 | 0 | 0 |
| 8 | 4.451E−04 | −2.076E−04 | 0 | 0 | 0 | 0 | 0 |
| 9 | 1.206E−04 | −5.259E−05 | −6.905E−05 | −5.514E−05 | 6.394E−05 | 4.780E−05 | −3.463E−05 |
| 10 | 2.427E−04 | 2.532E−04 | −1.009E−04 | 0 | 0 | 0 | 0 |
| 11 | −7.931E−06 | 2.977E−05 | 5.893E−06 | −2.283E−06 | 0 | 0 | 0 |
| 12 | −1.237E−05 | −1.823E−06 | −1.109E−07 | 5.097E−08 | 1.058E−07 | 0 | 0 |
| 13 | 3.356E−06 | −4.663E−07 | 5.518E−08 | −1.761E−08 | 6.688E−09 | 0 | 0 |

Numerical Example 6

Figure 6:
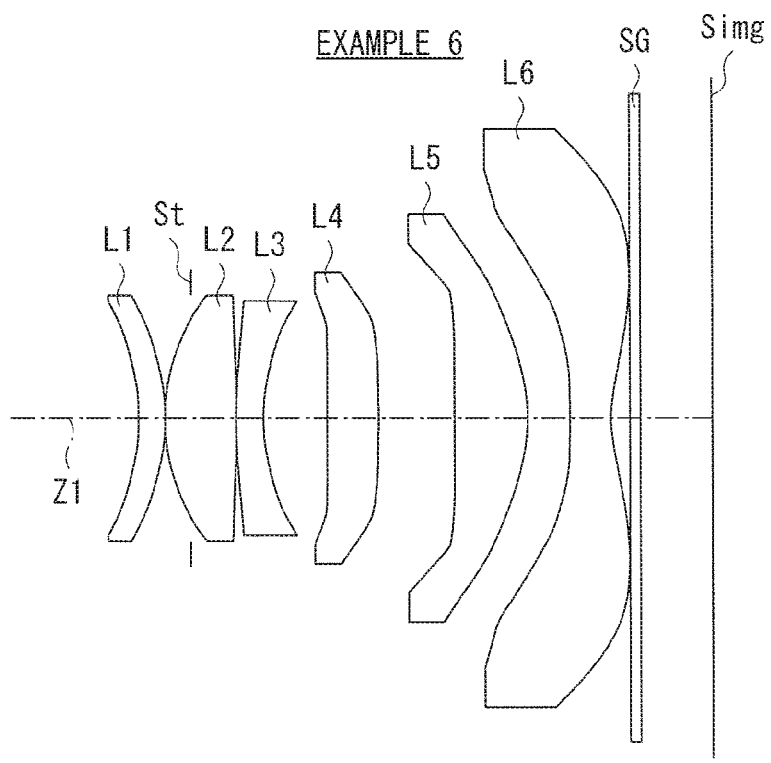
FIG. 6 illustrates a sixth configuration example of the imaging lens, and is a cross-sectional view of a lens corresponding to Numerical example 6.
Figure 7:
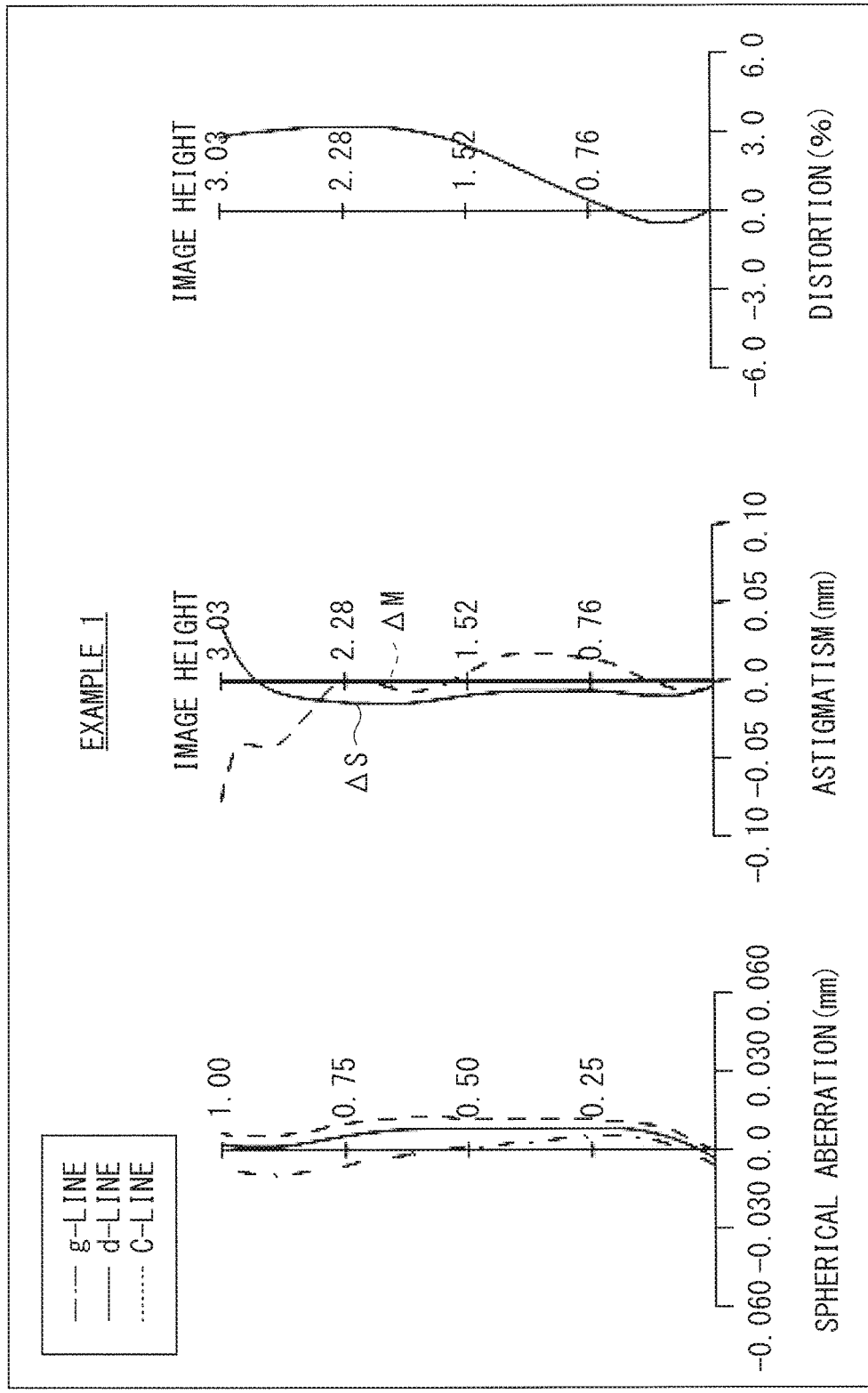
FIG. 7 illustrates a first set of various aberrations of the imaging lens, and is a characteristic curve diagram of the lens corresponding to Numerical example 1.
Figure 8:
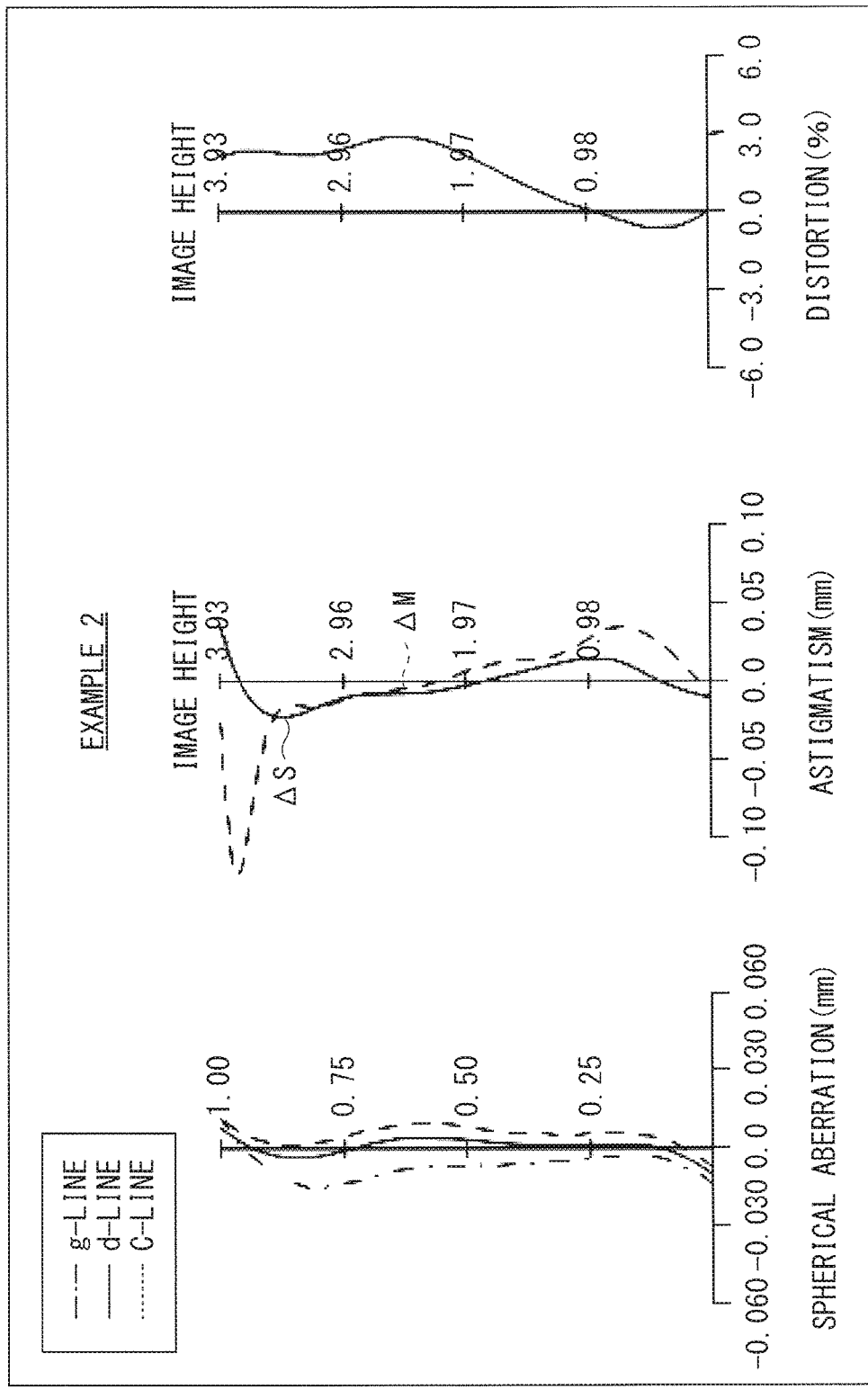
FIG. 8 illustrates a second set of various aberrations of the imaging lens, and is a characteristic curve diagram of the lens corresponding to Numerical example 2.
Figure 9:
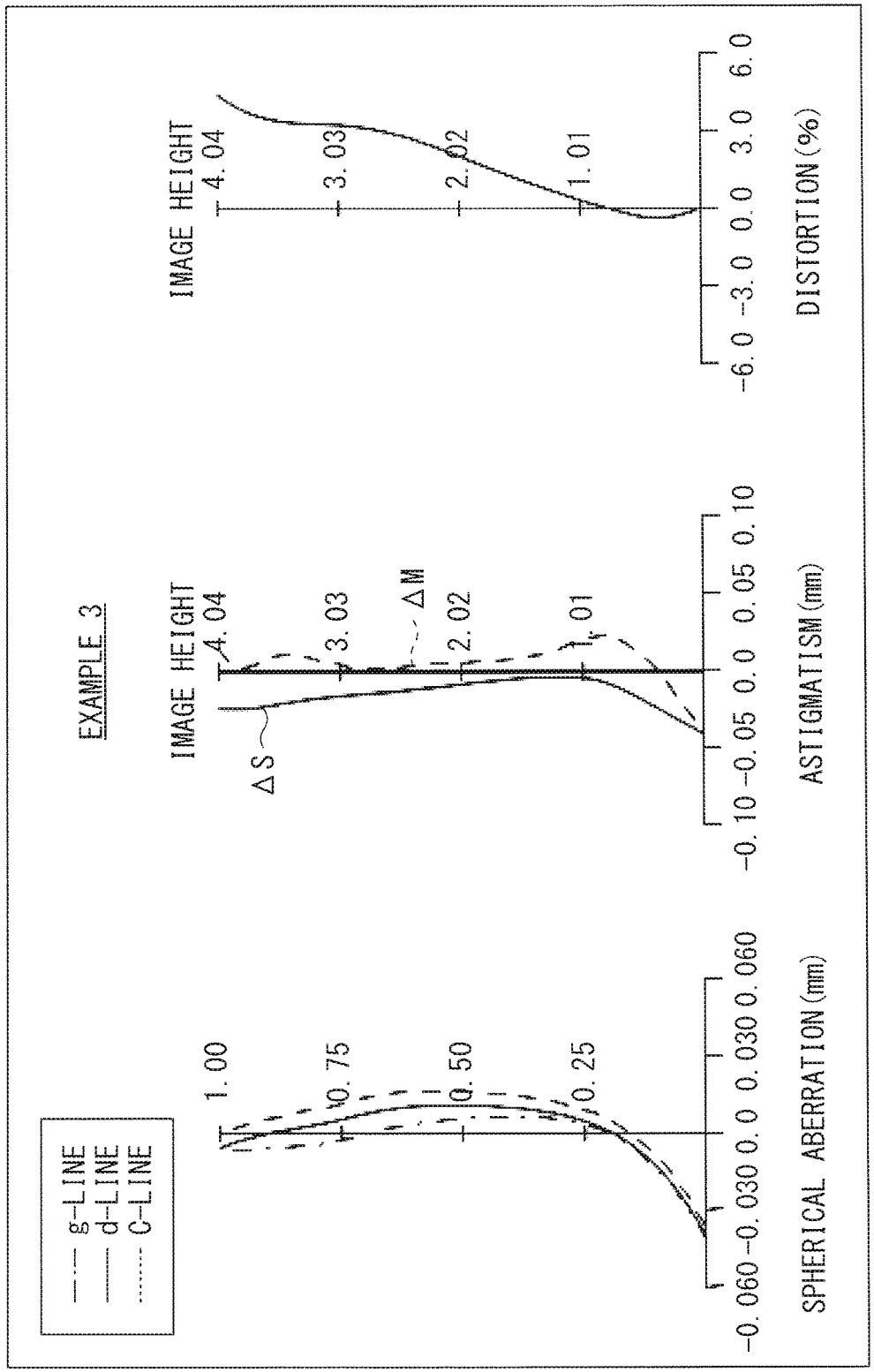
FIG. 9 illustrates a third set of various aberrations of the imaging lens, and is a characteristic curve diagram of the lens corresponding to Numerical example 3.
Figure 10:
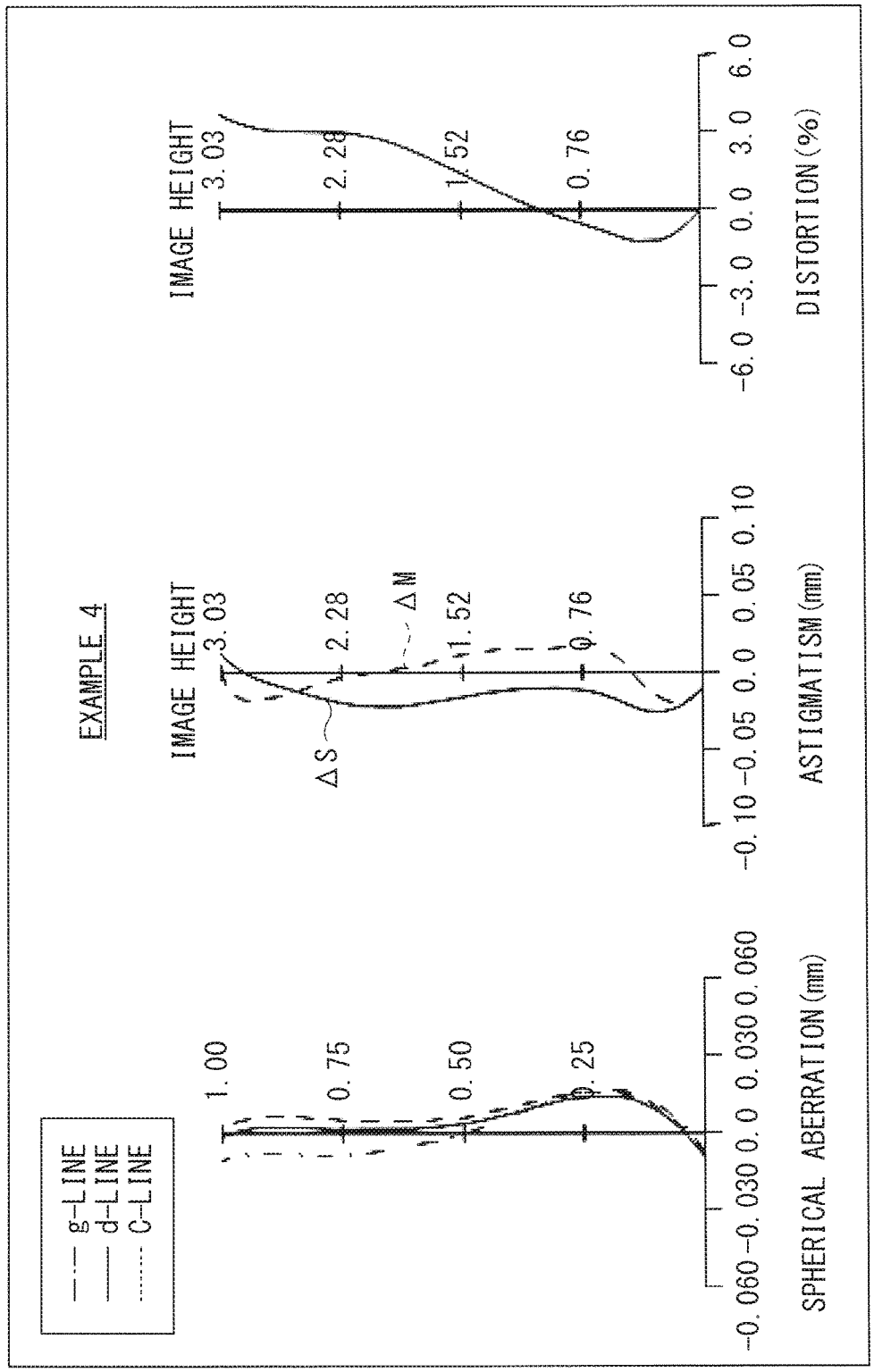
FIG. 10 illustrates a fourth set of various aberrations of the imaging lens, and is a characteristic curve diagram of the lens corresponding to Numerical example 4.
Figure 11:
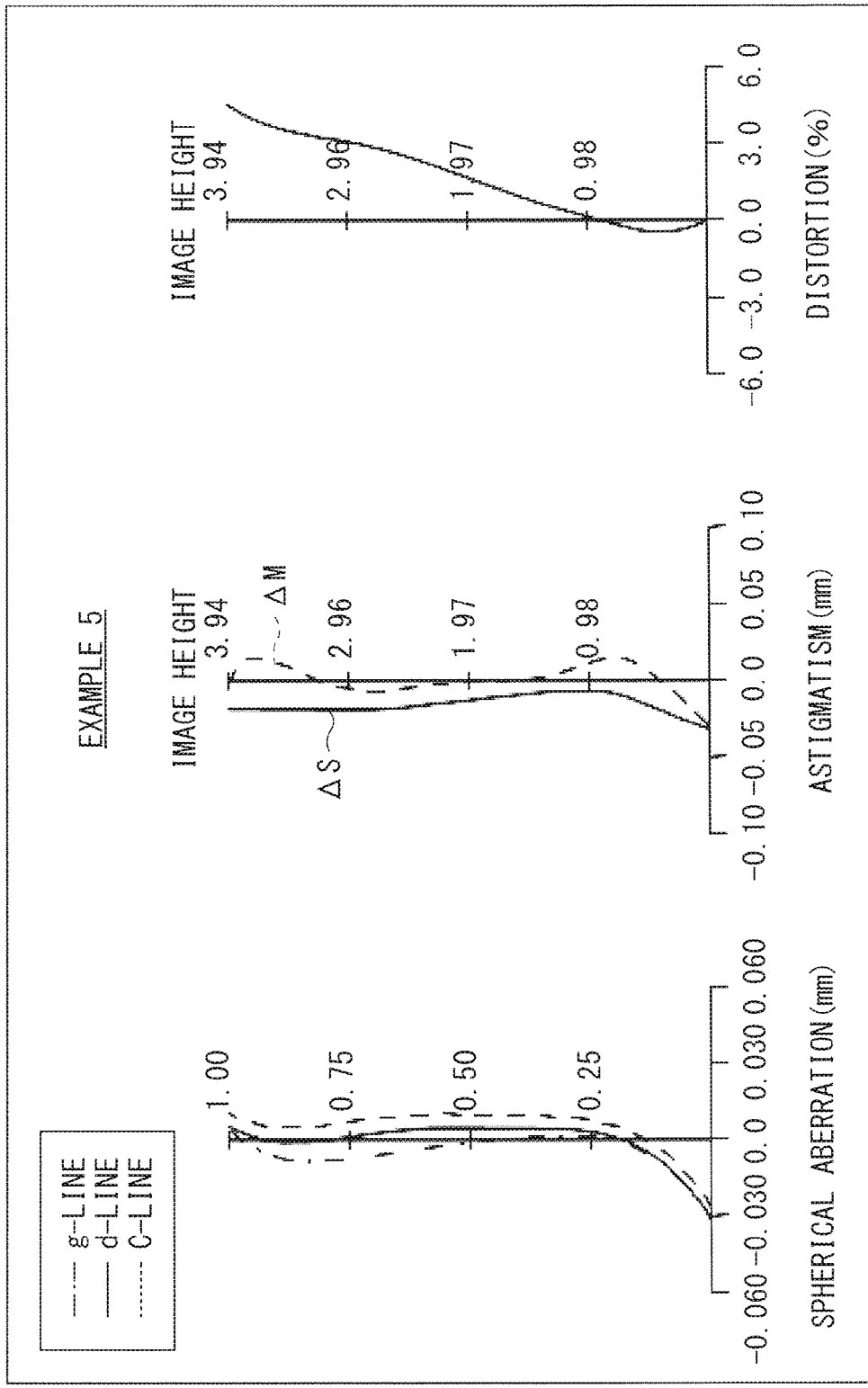
FIG. 11 illustrates a fifth set of various aberrations of the imaging lens, and is a characteristic curve diagram of the lens corresponding to Numerical example 5.
Figure 12:
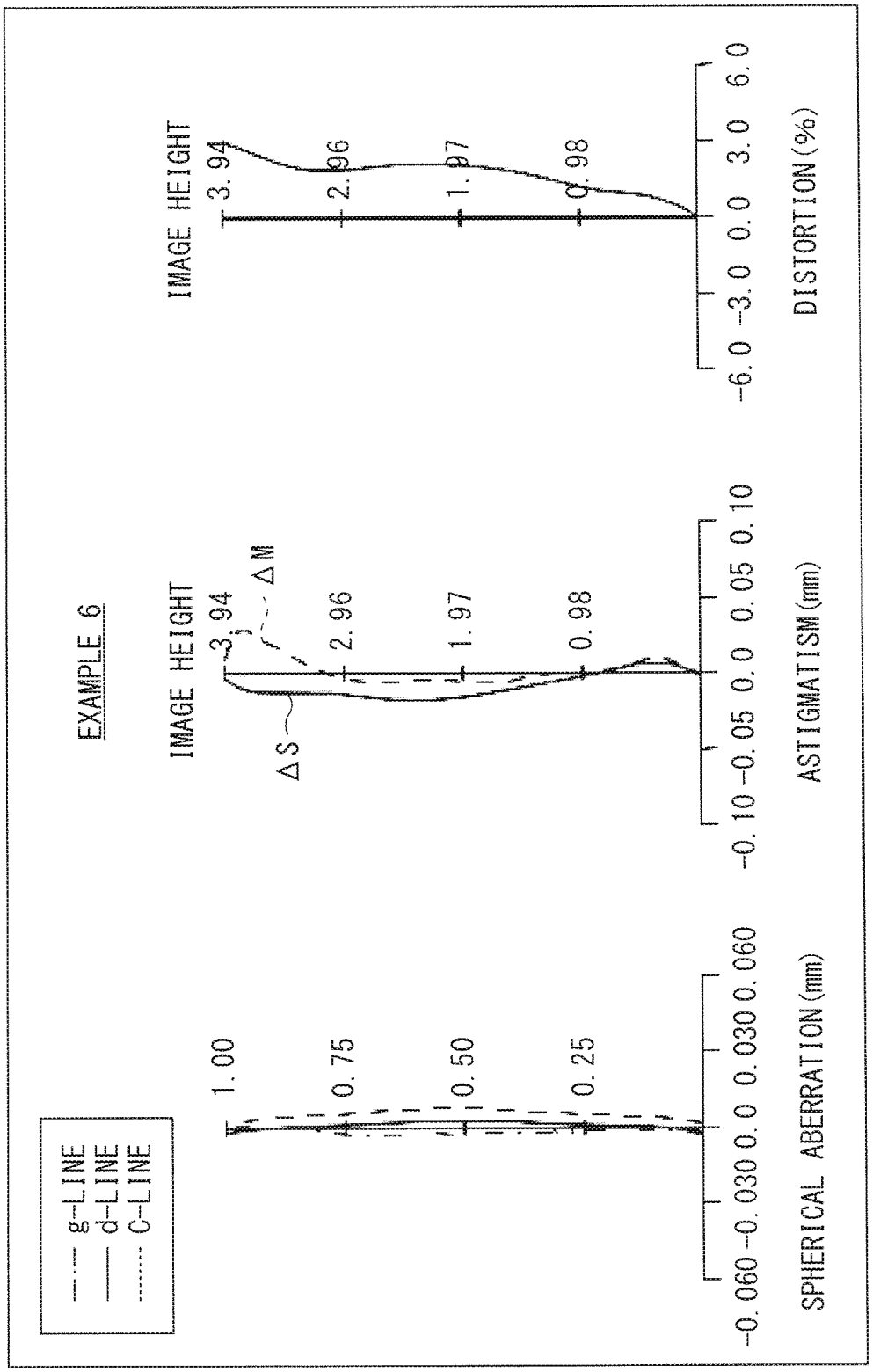
FIG. 12 illustrates a sixth set of various aberrations of the imaging lens, and is a characteristic curve diagram of the lens corresponding to Numerical example 6.

Table 11 and Table 12 show specific lens data corresponding to the imaging lens according to the sixth configuration example shown in FIG. 6. In particular, Table 11 shows basic lens data thereof, and Table 12 shows data related to the aspherical surfaces.

In the sixth configuration example, the first lens L1 has a meniscus shape that has a concave surface facing toward the object plane. The central portion of the fourth lens L4 has a meniscus shape that has a convex surface facing toward the object plane. The aperture stop St is arranged between the first lens L1 and the second lens L2.

Values of F number, total angle of view $2\omega$ of diagonal corners, and total focal length f of the imaging lens are as follows.

$FNo=1.87$ $f=4.96$ $2\omega=75.34°$

TABLE 11

Example 6

| Si | Ri | di | ni | vi |
|---|---|---|---|---|
| 1(ASP) | -2.70 | 0.300 | 1.535 | 56.3 |
| 2(ASP) | -2.489 | 0.001 | | |
| 3 | (STO) | -0.300 | | |
| 4(ASP) | 2.214 | 0.796 | 1.535 | 56.3 |
| 5(ASP) | -32.062 | 0.020 | | |
| 6(ASP) | 8.116 | 0.300 | 1.635 | 23.9 |
| 7(ASP) | 2.358 | 0.713 | | |
| 8(ASP) | 14.074 | 0.560 | 1.535 | 56.3 |
| 9(ASP) | 139.905 | 0.867 | | |
| 10(ASP) | -50.812 | 0.809 | 1.535 | 56.3 |
| 11(ASP) | -1.983 | 0.478 | | |
| 12(ASP) | -35.021 | 0.450 | 1.535 | 56.3 |
| 13(ASP) | 1.719 | 0.218 | | |
| 14 | ∞ | 0.110 | 1.512 | 56.9 |
| 15 | ∞ | 0.834 | | |
| 16 | (IMG) | | | |

TABLE 12

Example 6

| Si | K | A | B | C | D | E | F | G |
|---|---|---|---|---|---|---|---|---|
| 1 | -6.220E-01 | 0 | -2.494E-03 | 0 | 8.198E-04 | 0 | -3.102E-05 | 0 |
| 2 | -3.446E-01 | 0 | 5.789E-03 | 0 | 3.678E-04 | 0 | -2.597E-05 | 0 |
| 4 | -4.010E-01 | 0 | 5.204E-03 | 0 | 6.456E-04 | 0 | 6.957E-04 | 0 |
| 5 | -8.363E+00 | 0 | 1.359E-02 | 0 | -9.879E-03 | 0 | -7.780E-04 | 0 |
| 6 | -9.459E+00 | -2.275E-03 | -1.182E-02 | -3.623E-04 | 1.610E-02 | -5.045E-04 | -1.499E-02 | -1.109E-03 |
| 7 | -5.819E+00 | -3.118E-03 | 1.706E-02 | 3.836E-03 | 1.081E-02 | 2.254E-03 | -7.696E-03 | -6.473E-04 |
| 8 | -3.978E+00 | -1.470E-03 | -3.628E-02 | -7.945E-03 | 6.835E-03 | -4.810E-03 | -1.668E-03 | 1.312E-03 |
| 9 | 1.000E+01 | 3.663E-04 | -3.799E-02 | 5.557E-04 | -5.564E-03 | -1.349E-03 | 6.989E-04 | 3.111E-04 |
| 10 | 1.000E+01 | 4.314E-03 | 2.681E-02 | -7.264E-03 | 2.303E-03 | -1.109E-03 | -2.254E-03 | -4.754E-04 |
| 11 | -6.459E+00 | -1.192E-02 | -1.223E-02 | 9.622E-03 | 1.143E-03 | -2.184E-03 | -6.192E-04 | 5.300E-05 |
| 12 | -1.000E+01 | -7.297E-02 | -2.361E-02 | 3.494E-03 | 3.943E-03 | 1.591E-04 | 1.069E-05 | -9.857E-06 |
| 13 | -8.253E+00 | -2.143E-02 | -3.389E-02 | 1.351E-02 | -4.828E-04 | -1.705E-04 | -1.471E-04 | -9.040E-06 |

| Si | H | I | J | K | L | M | N |
|---|---|---|---|---|---|---|---|
| 1 | -2.636E-05 | 0 | 1.304E-05 | 0 | -1.033E-06 | 0 | 0 |
| 2 | 7.083E-07 | 0 | 8.384E-06 | 0 | -7.173E-07 | 0 | 0 |
| 4 | -3.605E-04 | 0 | 0 | 0 | 0 | 0 | 0 |
| 5 | 1.672E-03 | 0 | -2.482E-04 | 0 | 0 | 0 | 0 |
| 6 | 6.173E-03 | 1.714E-03 | -1.469E-03 | 0 | 0 | 0 | 0 |
| 7 | 1.950E-03 | 8.392E-04 | 0 | 0 | 0 | 0 | 0 |
| 8 | 1.278E-03 | -1.562E-03 | 0 | 0 | 0 | 0 | 0 |
| 9 | -1.029E-05 | -1.929E-04 | -1.451E-04 | -7.913E-05 | 7.060E-05 | 5.725E-05 | -3.918E-05 |
| 10 | 5.383E-04 | 3.344E-04 | -2.205E-04 | 0 | 0 | 0 | 0 |
| 11 | 2.066E-05 | 4.127E-05 | 8.831E-06 | -2.056E-06 | 0 | 0 | 0 |
| 12 | -1.044E-05 | -1.892E-06 | -3.106E-07 | -3.840E-08 | 6.400E-08 | 0 | 0 |
| 13 | 4.986E-06 | 5.555E-07 | 3.759E-07 | 1.300E-08 | -5.322E-09 | 0 | 0 |

Other Numerical Data of Respective Examples

Table 13 shows a summary of values related to the above-described respective conditional expressions for the respective numerical examples. As can be seen from Table 13, in Conditional expressions (1) to (10), the values in the respective numerical examples are within the range of the numerical values. In Conditional expression (11), the values in Examples 3 and 6 are within the range of the numerical values.

TABLE 13

| Conditional expression | | Example 1 | Example 2 | Example 3 | Example 4 | Example 5 | Example 6 |
|---|---|---|---|---|---|---|---|
| (1) | vd2 | 56.3 | 56.3 | 56.3 | 56.3 | 56.3 | 56.3 |
| (2) | vd4 | 56.3 | 56.3 | 56.3 | 56.3 | 56.3 | 56.3 |
| (3) | vd1 | 56.3 | 56.3 | 56.3 | 56.3 | 56.3 | 56.3 |
| (4) | vd3 | 23.9 | 23.9 | 23.9 | 23.9 | 23.9 | 23.9 |
| (5) | vd5 | 56.3 | 56.3 | 56.3 | 56.3 | 56.3 | 56.3 |
| (6) | vd6 | 56.3 | 56.3 | 56.3 | 56.3 | 56.3 | 56.3 |
| (7) | f/f1 | 0.55 | 1.20 | 0.06 | 1.14 | 0.0003 | 0.13 |
| (8) | f/f2 | 0.82 | 0.29 | 1.40 | 0.24 | 1.44 | 1.31 |
| (9) | f/f3 | -0.93 | -0.97 | -0.92 | -0.99 | -0.91 | -0.96 |
| (10) | f/f5 | 1.86 | 1.98 | 1.84 | 1.92 | 1.82 | 1.34 |
| (11) | (r2 + r1)/(r2 - r1) | 2.9 | 1.2 | -22.9 | 0.7 | 199.0 | -24.1 |

[Aberration Performance]

FIGS. 7 to 12 illustrate aberration performances of the respective numerical examples. In each of the drawings, a spherical aberration, an astigmatism, and a distortion are shown in aberration diagrams. Each aberration diagram shows an aberration where a d-line is used as a reference wavelength. Each spherical aberration diagram also shows aberrations of a g-line (having a wavelength of 435.8 nm) and of a C-line (having a wavelength of 656.3 nm). In the astigmatism diagram, $\Delta S$ shows an aberration in a sagittal direction, and $\Delta M$ shows an aberration in a meridional (tangential) direction.

As can be seen from the above-described respective aberration diagrams, an imaging lens in which aberrations are favorably corrected is achieved in each Example.

5. Other Embodiments

The technology of the present disclosure is not limited to the description of the above embodiment and Examples, and is embodied in various modifications.

For example, the shapes and the numerical values of the respective sections shown in the above-described numerical examples are mere examples to specifically embody the present technology, and the technical range of the present technology should not be limitedly understood based on those examples.

Further, the above embodiment and Examples have been described on a configuration substantially configured of six lenses. However, a lens that has substantially no refractive power may be further provided.

It is possible to achieve at least the following configurations from the above-described example embodiments and the modifications of the disclosure.

[1]

An imaging lens including:
a first lens having positive refractive power;
a second lens having positive refractive power;
a third lens having negative refractive power;
a fourth lens having positive refractive power;
a fifth lens having positive refractive power; and
a sixth lens having negative refractive power in vicinity of an optical axis and having positive refractive power in a peripheral portion,
the first to sixth lenses being arranged in order from object plane.

[2]

The imaging lens according to the above-described [1], wherein following conditional expressions are satisfied, $$vd2 > 50 \quad (1)$$

$$vd4 > 50 \quad (2)$$

where vd2 is an Abbe number of a d-line of the second lens, and
vd4 is an Abbe number of a d-line of the fourth lens.

[3]

The imaging lens according to the above-described [1] or [2], wherein following conditional expressions are satisfied, $$vd1 > 50 \quad (3)$$

$$vd3 < 30 \quad (4)$$

$$vd5 > 50 \quad (5)$$

$$vd6 > 50 \quad (6)$$

where vd1 is an Abbe number of a d-line of the first lens,
vd3 is an Abbe number of a d-line of the third lens,
vd5 is an Abbe number of a d-line of the fifth lens, and
vd6 is an Abbe number of a d-line of the sixth lens.

[4]

The imaging lens according to any one of the above-described [1] to [3], wherein following conditional expression is satisfied, $$0 < f/f1 < 1.32 \quad (7)$$

where f is a total focal length of the imaging lens, and
f1 is a focal length of the first lens.

[5]

The imaging lens according to any one of the above-described [1] to [4], wherein following conditional expression is satisfied, $$0.2 < f/f2 < 1.58 \quad (8)$$

where f2 is a focal length of the second lens.

[6]

The imaging lens according to any one of the above-described [1] to [5], wherein following conditional expression is satisfied, $$-1.09 < f/f3 < -0.82 \quad (9)$$

where f3 is a focal length of the third lens.

[7]

The imaging lens according to any one of the above-described [1] to [6], wherein following conditional expression is satisfied, $$1.19 < f/f5 < 2.18 \quad (10)$$

where f5 is a focal length of the fifth lens.

[8]

The imaging lens according to any one of the above-described [1] to [7], wherein an image-sided surface of the second lens has a convex shape facing toward image plane.

[9]

The imaging lens according to any one of the above-described [1] to [8], wherein following conditional expression is satisfied, $$-26 < (r2+r1)/(r2-r1) < 0 \quad (11)$$

where r1 is a curvature radius of an object-sided surface of the first lens, and
r2 is a curvature radius of an image-sided surface of the first lens.

[10]

The imaging lens according to any one of the above-described [1] to [8], wherein following conditional expression is satisfied, $$0.50 < f/f1 < 1.32 \quad (7)'$$

where f is a total focal length of the imaging lens, and
f1 is a focal length of the first lens.

[11]

The imaging lens according to any one of the above-described [1] to [10], wherein an aperture stop is arranged closer to the object plane than an image-sided surface of the second lens is.

[12]

The imaging lens according to any one of the above-described [1] to [11], wherein all of the first to sixth lenses are made of resin.

[13]

The imaging lens according to any one of the above-described [1] to [12], further including a lens that substantially has no refractive power.

[14]

An imaging apparatus with an imaging lens and an imaging device outputting an imaging signal based on an optical image formed by the imaging lens, the imaging lens including:
a first lens having positive refractive power;
a second lens having positive refractive power;
a third lens having negative refractive power;
a fourth lens having positive refractive power;
a fifth lens having positive refractive power; and
a sixth lens having negative refractive power in vicinity of an optical axis and having positive refractive power in a peripheral portion,
the first to sixth lenses being arranged in order from object plane.

[15]

The imaging apparatus according to the above-described [14], further including a lens that substantially has no refractive power.

It should be understood by those skilled in the art that various modifications, combinations, sub-combinations, and alterations may occur depending on design requirements and other factors insofar as they are within the scope of the appended claims or the equivalents thereof.

What is claimed is:

1. An imaging lens comprising:
a first lens having positive refractive power and being configured to have a concave surface towards an object side;
a second lens having positive refractive power;
a third lens having negative refractive power;
a fourth lens having positive refractive power;
a fifth lens having positive refractive power; and
a sixth lens having negative refractive power in vicinity of an optical axis and having positive refractive power in a peripheral portion,
the first to sixth lenses being arranged in order from the object side, wherein the following conditional expressions are satisfied, $$vd1>50 \qquad (3)$$

$$vd3<30 \qquad (4)$$

$$vd5>50 \qquad (5)$$

$$vd6>50 \qquad (6), \text{wherein}$$

vd1 is an Abbe number of a d-line of the first lens,
vd3 is an Abbe number of a d-line of the third lens,
vd5 is an Abbe number of a d-line of the fifth lens, and
vd6 is an Abbe number of a d-line of the sixth lens.

2. The imaging lens according to claim 1, wherein the following conditional expressions are satisfied, $$vd2>50 \qquad (1)$$

$$vd4>50 \qquad (2), \text{wherein}$$

vd2 is an Abbe number of a d-line of the second lens, and
vd4 is an Abbe number of a d-line of the fourth lens.

3. The imaging lens according to claim 1, wherein a following conditional expression is satisfied, $$0<f/f1<1.32 \qquad (7), \text{wherein}$$

f is a total focal length of the imaging lens, and
f1 is a focal length of the first lens.

4. The imaging lens according to claim 1, wherein a following conditional expression is satisfied, $$0.2<f/f2<1.58 \qquad (8), \text{wherein}$$

f is a total focal length of the imaging lens, and
f2 is a focal length of the second lens.

5. The imaging lens according to claim 1, wherein a following conditional expression is satisfied, $$-1.09<f/f3<-0.82 \qquad (9), \text{wherein}$$

f is a total focal length of the imaging lens, and
f3 is a focal length of the third lens.

6. The imaging lens according to claim 1, wherein a following conditional expression is satisfied, $$1.19<f/f5<2.18 \qquad (10), \text{wherein}$$

f is a total focal length of the imaging lens, and
f5 is a focal length of the fifth lens.

7. The imaging lens according to claim 1, wherein an image-sided surface of the second lens has a convex shape facing toward an image side.

8. The imaging lens according to claim 1, wherein a following conditional expression is satisfied, $$0.50<f/f1<1.32 \qquad (7), \text{wherein}$$

f is a total focal length of the imaging lens, and
f1 is a focal length of the first lens.

9. The imaging lens according to claim 1, wherein an aperture stop is arranged closer to the object side than an image-sided surface of the second lens is.

10. The imaging lens according to claim 1, wherein all of the first to sixth lenses are made of resin.

11. An imaging apparatus with an imaging lens and an imaging device outputting an imaging signal based on an optical image formed by the imaging lens, the imaging lens comprising:
a first lens having positive refractive power and being configured to have a concave surface towards an object side;
a second lens having positive refractive power;
a third lens having negative refractive power;
a fourth lens having positive refractive power;
a fifth lens having positive refractive power; and
a sixth lens having negative refractive power in vicinity of an optical axis and having positive refractive power in a peripheral portion,
the first to sixth lenses being arranged in order from the object side, wherein a following conditional expressions are satisfied, $$vd1>50 \qquad (3)$$

$$vd3<30 \qquad (4)$$

$$vd5>50 \qquad (5)$$

$$vd6>50 \qquad (6), \text{wherein}$$

vd1 is an Abbe number of a d-line of the first lens,
vd3 is an Abbe number of a d-line of the third lens,
vd5 is an Abbe number of a d-line of the fifth lens, and
vd6 is an Abbe number of a d-line of the sixth lens.

12. The imaging apparatus according to claim 11, wherein a following conditional expressions are satisfied, $$vd2>50 \qquad (1)$$

$$vd4>50 \qquad (2), \text{wherein}$$

vd2 is an Abbe number of a d-line of the second lens, and
vd4 is an Abbe number of a d-line of the fourth lens.

13. The imaging apparatus according to claim 11, wherein a following conditional expression is satisfied, $$0<f/f1<1.32 \qquad (7), \text{wherein}$$

f is a total focal length of the imaging lens, and
f1 is a focal length of the first lens.

14. The imaging apparatus according to claim 11, wherein a following conditional expression is satisfied, $$0.2<f/f2<1.58 \qquad (8), \text{wherein}$$

f is a total focal length of the imaging lens, and
f2 is a focal length of the second lens.

15. The imaging apparatus according to claim 11, wherein a following conditional expression is satisfied, $$-1.09<f/f3<-0.82 \qquad (9), \text{wherein}$$

f is a total focal length of the imaging lens, and
f3 is a focal length of the third lens.

16. The imaging apparatus according to claim 11, wherein a following conditional expression is satisfied, $$1.19<f/f5<2.18 \qquad (10), \text{wherein}$$

f is a total focal length of the imaging lens, and
f5 is a focal length of the fifth lens.

17. The imaging apparatus according to claim 11, wherein an image-sided surface of the second lens has a convex shape facing toward an image side.

18. An imaging lens comprising:
- a first lens having positive refractive power;
- a second lens having positive refractive power;
- a third lens having negative refractive power;
- a fourth lens having positive refractive power;
- a fifth lens having positive refractive power; and
- a sixth lens having negative refractive power in vicinity of an optical axis and having positive refractive power in a peripheral portion,
- the first to sixth lenses being arranged in order from the object side, wherein following conditional expression is satisfied, $$-26 < (r2+r1)/(r2-r1) < 0 \quad (11)$$

where r1 is a curvature radius of an object-sided surface of the first lens, and r2 is a curvature radius of an image-sided surface of the first lens.

* * * * *